United States Patent
Yang

(10) Patent No.: US 9,847,190 B1
(45) Date of Patent: Dec. 19, 2017

(54) MECHANISM TO RAISE AND LOWER THE HEIGHT OF KEYS WITHIN A KEYBOARD

(71) Applicant: PRIMAX ELECTRONICS LTD., Taipei (TW)

(72) Inventor: Che-Wei Yang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 15/220,196

(22) Filed: Jul. 26, 2016

(30) Foreign Application Priority Data

Jun. 8, 2016 (TW) .............................. 105118136 A

(51) Int. Cl.
*H01H 1/10* (2006.01)
*H01H 13/14* (2006.01)
*H01H 13/52* (2006.01)

(52) U.S. Cl.
CPC ............ *H01H 13/14* (2013.01); *H01H 13/52* (2013.01)

(58) Field of Classification Search
CPC .. H01H 3/125; H01H 13/705; H01H 13/7057; H01H 13/7065; H01H 2223/052; G06F 1/1666; G06F 3/0216; G06F 3/0221

USPC ............ 200/517, 344; 400/492; 361/679.11, 361/679.13
See application file for complete search history.

(56) References Cited

U.S. PATENT DOCUMENTS 6,139,207 A * 10/2000 Kawabe ................ G06F 1/1616
200/341

* cited by examiner

*Primary Examiner* — Vanessa Girardi
(74) *Attorney, Agent, or Firm* — Kirton McConkie; Evan R. Witt

(57) ABSTRACT

A key structure includes a supporting plate, a keycap, a scissors-type connecting element, a movable element and a coupling structure. The keycap is disposed over the supporting plate. The coupling structure is connected with the scissors-type connecting element and the movable element. For operating the key structure, the cooperation of the movable element and the coupling structure allows the keycap to be at a higher first height. Consequently, the tactile feel of depressing the key structure is enhanced. Moreover, the cooperation of the movable element and the coupling structure can lower the height of the keycap. Consequently, the key structure has a slim appearance.

9 Claims, 10 Drawing Sheets

MECHANISM TO RAISE AND LOWER THE HEIGHT OF KEYS WITHIN A KEYBOARD

FIELD OF THE INVENTION

The present invention relates to a key structure, and more particularly to a slim-type key structure.

BACKGROUND OF THE INVENTION

Generally, the widely-used peripheral input device of a computer system includes for example a mouse, a keyboard, a trackball, or the like. Via the keyboard, characters or symbols can be directly inputted to the computer system. As a consequence, most users and most manufacturers of input devices pay much attention to the development of the keyboards. As known, a keyboard with scissors-type connecting elements is one of the widely-used keyboards.

A keyboard with scissors-type connecting elements will be illustrated as follows. For succinctness, only one key structure is shown. FIG. 1 is a schematic side cross-sectional view illustrating a key structure of a conventional keyboard. As shown in FIG. 1, the conventional key structure 1 comprises a keycap 11, a scissors-type connecting element 12, a rubbery elastomer 13, a membrane switch circuit member 14 and a base plate 15. The keycap 11, the scissors-type connecting element 12, the rubbery elastomer 13 and the membrane switch circuit member 14 are supported by the base plate 15. The scissors-type connecting element 12 is used for connecting the base plate 15 and the keycap 11.

The membrane switch circuit member 14 comprises plural key intersections (not shown). When one of the plural key intersections is triggered, a corresponding key signal is generated. The rubbery elastomer 13 is disposed on the membrane switch circuit member 14. Each rubbery elastomer 13 is aligned with a corresponding key intersection. When the rubbery elastomer 13 is depressed, the rubbery elastomer 13 is subjected to deformation to push the corresponding key intersection of the membrane switch circuit member 14. Consequently, the corresponding key signal is generated.

The scissors-type connecting element 12 is arranged between the base plate 15 and the keycap 11, and the base plate 15 and the keycap 11 are connected with each other through the scissors-type connecting element 12. The scissors-type connecting element 12 comprises a first frame 121 and a second frame 122. A first end of the first frame 121 is connected with the keycap 11. A second end of the first frame 121 is connected with the base plate 15. The rubbery elastomer 13 is enclosed by the scissors-type connecting element 12. Moreover, the first frame 121 comprises a first keycap post 1211 and a first base plate post 1212. The first frame 121 is connected with the keycap 11 through the first keycap post 1211. The first frame 121 is connected with the base plate 15 through the first base plate post 1212. The second frame 122 is combined with the first frame 121. A first end of the second frame 122 is connected with the base plate 15. A second end of the second frame 122 is connected with the keycap 11. Moreover, the second frame 122 comprises a second keycap post 1221 and a second base plate post 1222. The second frame 122 is connected with the keycap 11 through the second keycap post 1221. The second frame 122 is connected with the base plate 15 through the second base plate post 1222.

The operations of the conventional key structure 1 in response to the depressing action of the user will be illustrated as follows. Please refer to FIG. 1 again. While the keycap 11 is depressed, the keycap 11 is moved downwardly to push the scissors-type connecting element 12 in response to the depressing force. As the keycap 11 is moved downwardly relative to the base plate 15, the keycap 11 pushes the corresponding rubbery elastomer 13. At the same time, the rubbery elastomer 13 is subjected to deformation to push the membrane switch circuit member 14 and trigger the corresponding key intersection of the membrane switch circuit member 14. Consequently, the membrane switch circuit member 14 generates a corresponding key signal. When the keycap 11 is no longer depressed by the user, no external force is applied to the keycap 11 and the rubbery elastomer 13 is no longer pushed by the keycap 11. In response to the elasticity of the rubbery elastomer 13, the rubbery elastomer 13 is restored to its original shape to provide an upward elastic restoring force. In response to the elastic restoring force, the keycap 11 is returned to its original position where it is not depressed.

Recently, the general trends of designing electronic devices and their peripheral devices are toward slimness, light weightiness an easy portability. Consequently, keyboard devices and other peripheral devices need to meet the requirements of slimness. For achieving this purpose, the manufacturers make efforts in minimizing the thickness of the keyboard. Conventionally, two approaches are used to reduce the thickness of the keyboard. In a first approach, the thicknesses of some components or all components of the key structure are decreased. In a second approach, the movable distance of the keycap (also referred as a travelling distance) is shortened. However, these approaches still have some drawbacks. In case that the first approach is adopted, the structural strength of the key structure is impaired, and thus the key structure is easily damaged. In case that the second approach is adopted, the tactile feel of depressing the key structure is deteriorated. In other words, it is difficult to reduce the thickness of the keyboard while obtaining the desired tactile feel.

Therefore, there is a need of providing a key structure with reduced thickness and enhanced tactile feel.

SUMMARY OF THE INVENTION

The present invention provides a key structure with reduced thickness and enhanced tactile feel.

In accordance with an aspect of the present invention, there is provided a key structure. The key structure includes a supporting plate, a keycap, a scissors-type connecting element, a movable element and a coupling structure. The keycap is disposed over the supporting plate, and movable relative to the supporting plate in a first direction. The scissors-type connecting element is connected with the supporting plate and the keycap. The movable element is disposed under the supporting plate, and movable relative to the supporting plate in a second direction. The coupling structure is connected with the movable element, and moved with the movable element. While the movable element is moved in the second direction, the coupling structure is moved with the movable element and the keycap is correspondingly moved in the first direction.

From the above descriptions, the present invention provides the key structure. The height of the key structure is changeable. For operating the key structure, the cooperation of the movable element and the coupling structure allows the keycap to be at a higher first height. For reducing the height of the key structure, the cooperation of the movable element and the coupling structure allows the keycap to be lowered. Consequently, the key structure has a slim appearance. In a laptop mode, the height of the key structure is not restricted. Since the movable distance of the keycap is increased, the tactile feel of depressing the key structure is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a keyboard with enhanced structural strength and slim appearance.

Figure 1:
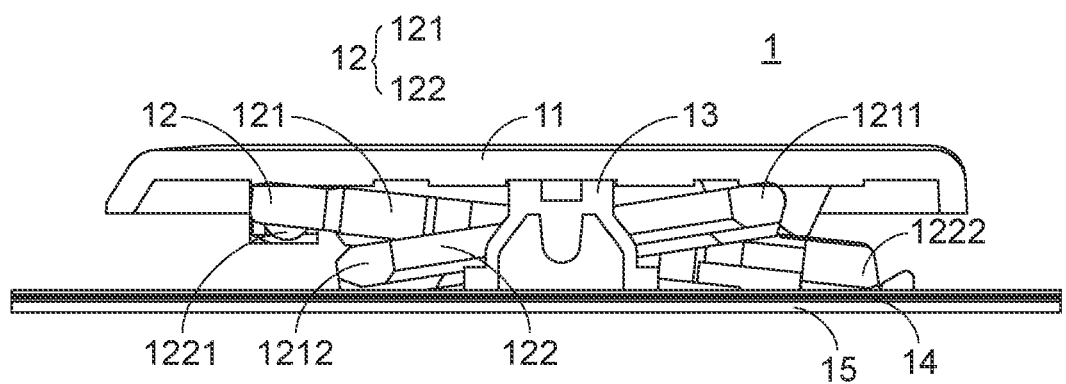
FIG. 1 is a schematic side cross-sectional view illustrating a key structure of a conventional keyboard.
Figure 2:
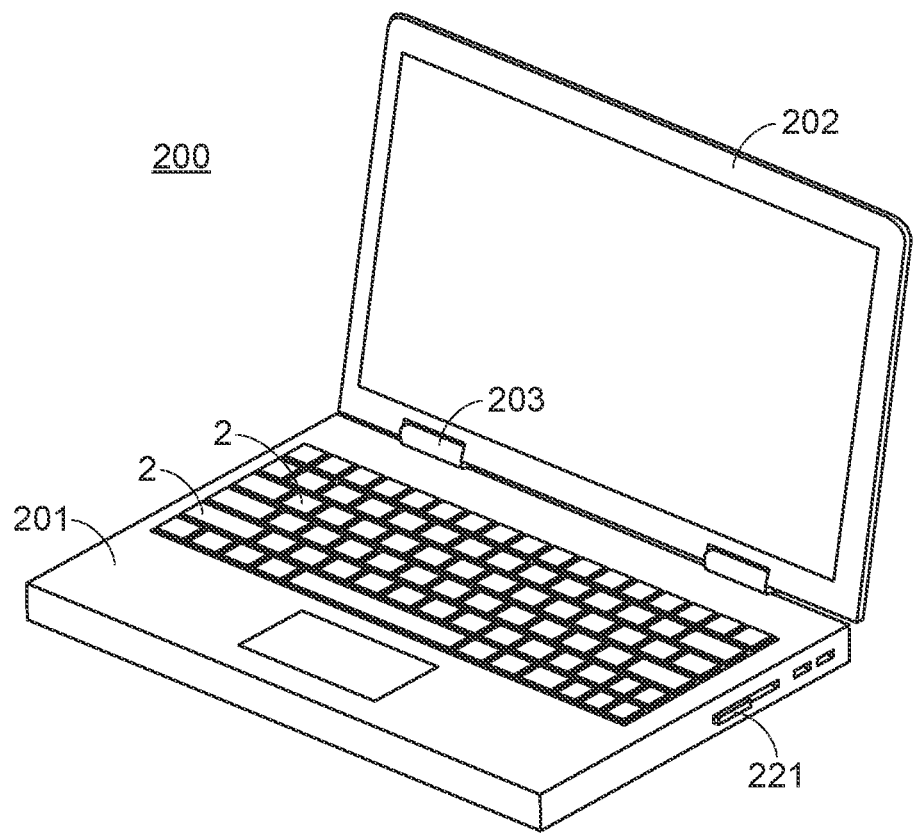
FIG. 2 is a schematic perspective view illustrating a notebook computer with key structures according to a first embodiment of the present invention.
Figure 3:
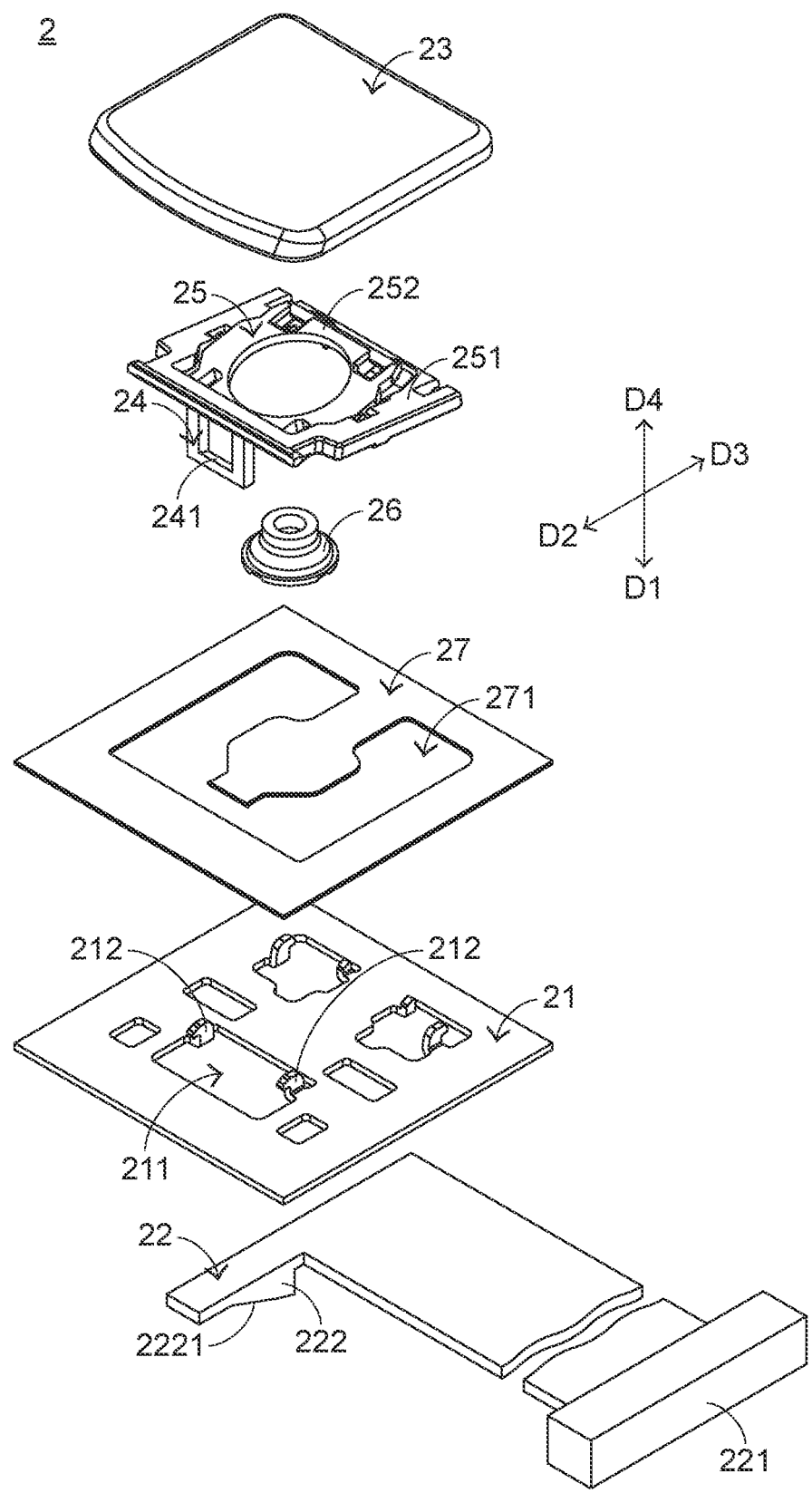
FIG. 3 is a schematic exploded view illustrating a key structure according to the first embodiment of the present invention.
Figure 4:
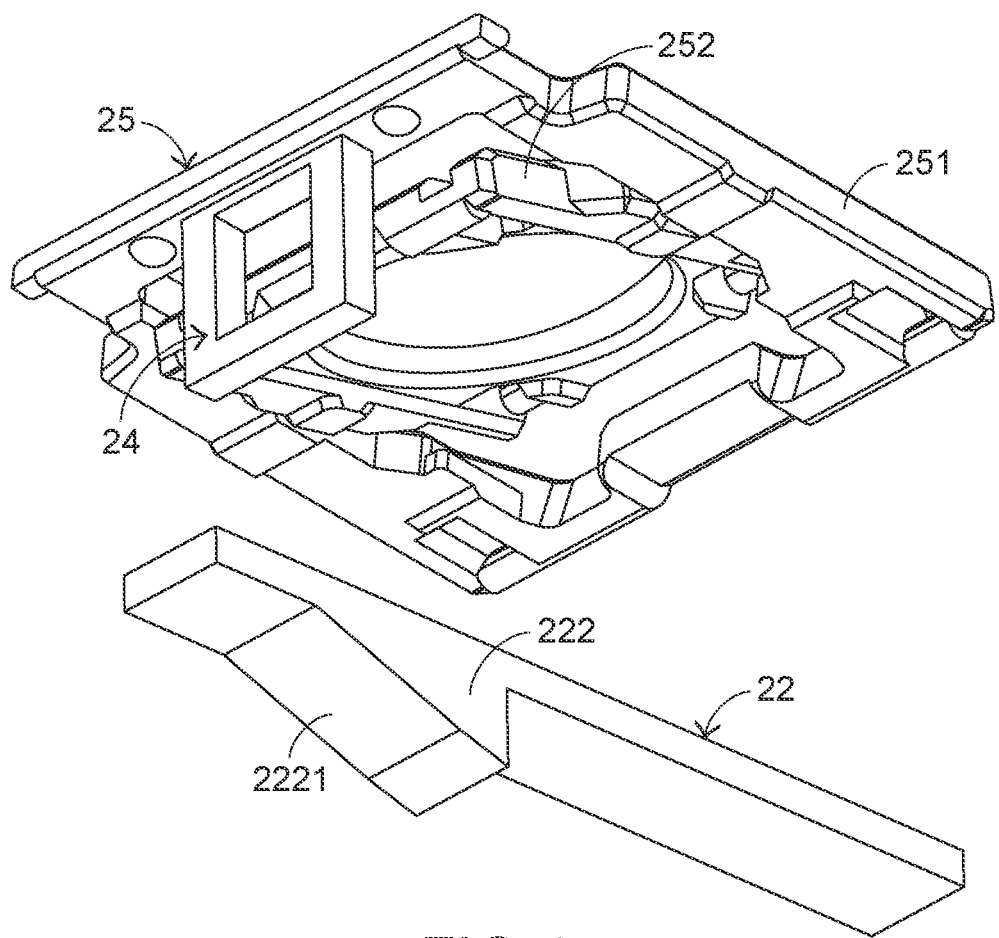
FIG. 4 is a schematic exploded view illustrating a scissors-type connecting element and a movable element of the key structure of FIG. 3 and taken along another viewpoint.

FIG. 2 is a schematic perspective view illustrating a notebook computer with key structures according to a first embodiment of the present invention. FIG. 3 is a schematic exploded view illustrating a key structure according to the first embodiment of the present invention. FIG. 4 is a schematic exploded view illustrating a scissors-type connecting element and a movable element of the key structure of FIG. 3 and taken along another viewpoint. As shown in FIGS. 2, 3 and 4, the key structure 2 comprises a supporting plate 21, a movable element 22, a keycap 23, a coupling structure 24, a scissors-type connecting element 25, an elastic element 26 and a membrane switch circuit member 27. The movable element 22 of the key structure 2 is installed in a keyboard base 201 of a notebook computer 200. A driving part 221 of the movable element 22 is exposed outside the keyboard base 201 to be pushed by the user. While the driving part 221 is manually pushed by the user, the movable element 22 is correspondingly moved. The keyboard base 201 is connected with a top cover 202. A rotary shaft 203 is connected with the top cover 202. Through the rotary shaft 203, the top cover 202 is rotatable relative to the keyboard base 201.

Please refer to FIGS. 3 and 4 again. The supporting plate 21 comprises a supporting plate opening 211 and plural supporting plate hooks 212. The supporting plate opening 211 is aligned with the coupling structure 24. The plural supporting plate hooks 212 are protruded upwardly from a top surface of the supporting plate 21. The keycap 23 is disposed over the supporting plate 21. As the keycap 23 is depressed by the user, the keycap 23 is moved relative to the supporting plate 21 in a first direction D1. Moreover, the keycap 23 comprises plural keycap hooks 231. The membrane switch circuit member 27 is disposed over the supporting plate 21. While the keycap 23 is moved downwardly to trigger the membrane switch circuit member 27, a key signal corresponding to the keycap 23 is generated. The membrane switch circuit member 27 comprises a membrane opening 271. The elastic element 26 is arranged between the keycap 23 and the membrane switch circuit member 27. When the elastic element 26 is pushed by the keycap 23, the membrane switch circuit member 27 is triggered by the elastic element 26. Moreover, the elastic element 26 can provide an elastic force. The scissors-type connecting element 25 is arranged between the keycap 23 and the membrane switch circuit member 27, and connected with the keycap 23 and the supporting plate 21. The scissors-type connecting element 25 is connected with the supporting plate 21 through the supporting plate hooks 212, and connected with the keycap 23 through the keycap hooks 231. Consequently, the scissors-type connecting element 25 is linked with the keycap 23. In this embodiment, the plural keycap hooks 231 are integrally formed with the keycap 23, and the elastic element 26 is a rubbery elastomer.

Please refer to FIGS. 3 and 4 again. The scissors-type connecting element 25 comprises a first frame 251 and a second frame 252. The second frame 252 is connected with the first frame 251. Moreover, the second frame 252 can be swung relative to the first frame 251. The coupling structure 24 is disposed on a bottom surface of the first frame 251, and connected with the movable element 22. As the movable element 22 is moved, the coupling structure 24 is correspondingly moved. In an embodiment, the coupling structure 24 has a first contact slant 241. Preferably but not exclusively, the coupling structure 24 is a coupling frame that is integrally formed with the first frame 251. It is noted that the example of the coupling structure 24 is not restricted. For example, in another embodiment, the coupling structure (e.g., the coupling frame) is combined with or adhered on the first frame or the second frame of the scissors-type connecting element.

Figure 5:
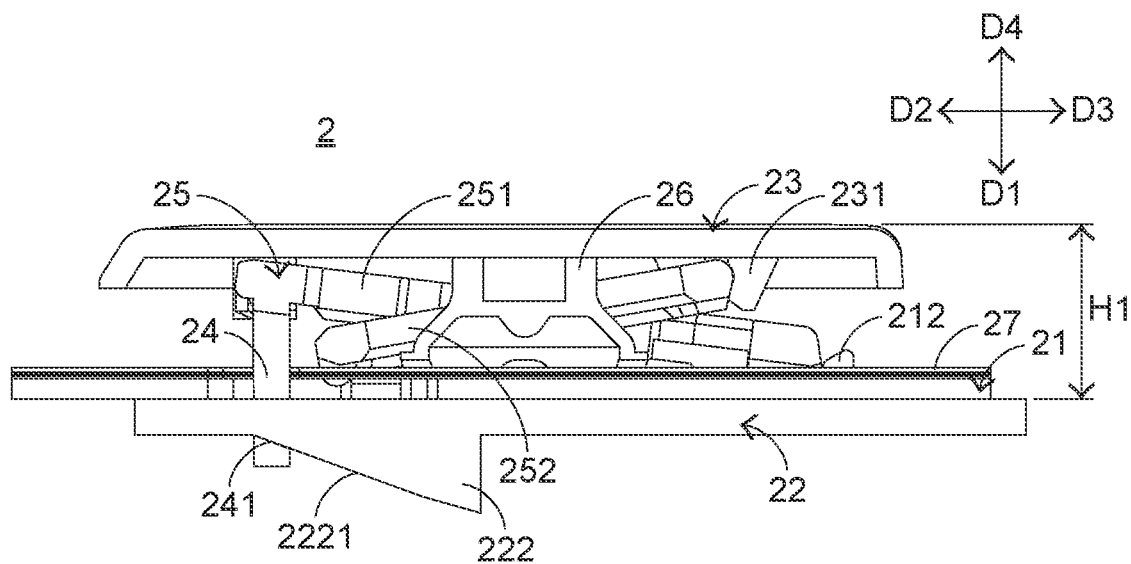
FIG. 5 is a schematic side cross-sectional view illustrating the key structure according to the first embodiment of the present invention.

FIG. 5 is a schematic side cross-sectional view illustrating the key structure according to the first embodiment of the present invention. Please refer to FIGS. 3, 4 and 5. The movable element 22 is disposed under the supporting plate 21, and movable relative to the supporting plate 21 in a second direction D2. The movable element 22 comprises a linking part 222. The linking part 222 is disposed on a bottom surface of the movable element 22. Moreover, a second contact slant 2221 is formed between the linking part 222 and the bottom surface of the movable element 22. As shown in FIG. 5, the coupling structure 24 is sequentially penetrated through the membrane opening 271 and the supporting plate opening 211 and located near the movable element 22. Moreover, the linking part 222 of the movable element 22 is penetrated through the coupling structure 24. Consequently, the first contact slant 241 and the second contact slant 2221 are contacted with each other. That is, the coupling structure 24 is movable along the second contact slant 2221. Preferably but not exclusively, the linking part 222 is integrally formed with the movable element 22. In another embodiment, the linking part is combined with or adhered on the movable element.

The operations of the key structure 2 in response to the depressing action of the user will be illustrated as follows. As shown in FIG. 5, the key structure 2 of the notebook computer is in a laptop mode. Meanwhile, the keycap 23 is at a first height H1. While the keycap 23 is depressed, the keycap 23 is moved in a first direction D1 (i.e., in the downward direction as shown in FIG. 5) in response to the depressing force and the scissors-type connecting element 25 is correspondingly swung. As the keycap 23 is moved in the first direction D1 to push the elastic element 26, the elastic element 26 is subjected to deformation to press the membrane switch circuit member 27 and trigger the corresponding key intersection (not shown) of the membrane switch circuit member 27. Consequently, the membrane switch circuit member 27 generates a corresponding key signal.

When the keycap 23 is no longer depressed by the user, no external force is applied to the keycap 23 and the elastic element 26 is no longer pushed by the keycap 23. In response to the elasticity of the elastic element 26, the elastic element 26 is restored to its original shape to provide an elastic restoring force to the keycap 23 in an opposite direction. As the keycap 23 is moved in a direction D4 opposite to the first direction D1 (i.e., in the upward direction as shown in FIG. 5), the scissors-type connecting element 25 is correspondingly swung. Consequently, the keycap 23 is returned to its original position where it is not depressed.

Figure 6:
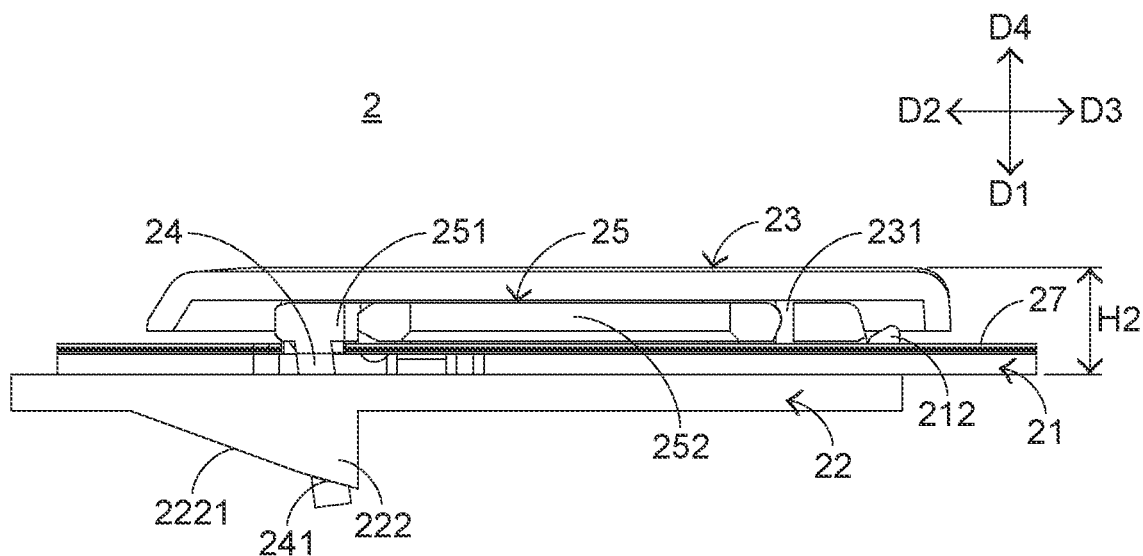
FIG. 6 is a schematic side cross-sectional view illustrating the key structure according to the first embodiment of the present invention, in which the movable element is pushed in the second direction.

Hereinafter, a process of changing the key structure 2 from the laptop mode to a slim-type mode will be illustrated with reference to FIGS. 2-6. FIG. 6 is a schematic side cross-sectional view illustrating the key structure according to the first embodiment of the present invention, in which the movable element is pushed in the second direction. In case that the key structure 2 is in a non-usage state and the user intends to reduce the height of the key structure 2, the user may move the driving part 221 to allow the movable element 22 to be moved in the second direction D2. Meanwhile, the linking part 222 inserted into the coupling structure 24 is correspondingly moved, and the first contact slant 241 of the coupling structure 24 is pushed by the second contact slant 2221. Consequently, the scissors-type connecting element 25 is moved in the first direction D1, and the keycap 23 is correspondingly moved with the scissors-type connecting element 25 in the first direction D1. That is, as the movable element 22 is moved, the keycap 23 is moved with the coupling structure 24 in the first direction D1. Consequently, as shown in FIG. 6, the keycap 23 is at a second height H2. The second height H2 is lower than the first height H1.

When the key structure 2 is in a usage state, the user may push the driving part 221 in an opposite direction. Consequently, the movable element 22 is moved in a third direction D3 opposite to the second direction D2. Meanwhile, the first contact slant 241 of the coupling structure 24 is no longer pushed by the second contact slant 2221. Consequently, the coupling structure 24 is moved along the second contact slant 2221 to the bottom surface of the movable element 22, and the scissors-type connecting element 25 is correspondingly moved in a fourth direction D4. The keycap 23 is moved with the scissors-type connecting element 25 in the fourth direction D4. Meanwhile, the height of the keycap 23 is returned to the first height H1 (see FIG. 5).

The following three aspects should be specially described.

Firstly, the elastic element 26 is a component of the key structure 2 for returning the keycap 23 in the vertical direction. It is noted that the component for returning the keycap in the vertical direction is not restricted. For example, in another embodiment, the key structure further comprises two magnetic elements. One of the magnetic elements is installed on the keycap, and the other magnetic element is installed on the supporting plate or the membrane switch circuit member. While the keycap is depressed, the two magnetic elements interact with each other to generate a repulsive force. In response to the repulsive force, the keycap is moved upwardly and returned to its original position. However, in this case, a protrusion structure is formed on an inner surface of the keycap to trigger the membrane switch circuit member.

Secondly, the movable element in this embodiment is pushed manually by pushing the driving part. Alternatively, in another embodiment, a position-returning element (e.g., a spring) is arranged between the keyboard base and the movable element. After the user pushes the driving part to move the movable element, the movable element is returned to its original position in response to the position-returning element. Under this circumstance, the movable element can be returned to its original position without the need of pushing the driving part again.

Thirdly, when the key structure is in the slim-type mode, the function of the membrane switch circuit member is disabled by executing a software program. Under this circumstance, since the membrane switch circuit member cannot be triggered by any object, the problem of causing erroneous operation is avoided.

Figure 7:
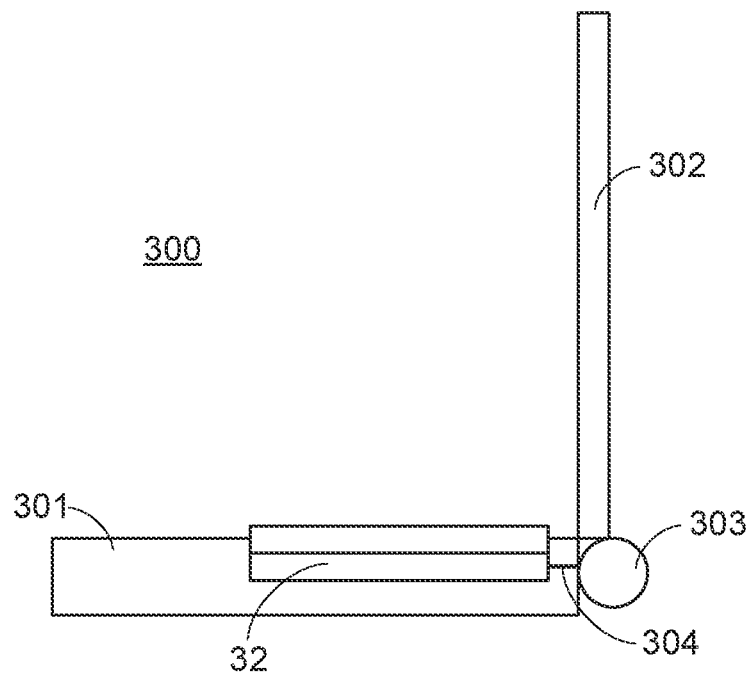
FIG. 7 is a schematic side cross-sectional view illustrating a notebook computer with key structures according to a second embodiment of the present invention.
Figure 8:
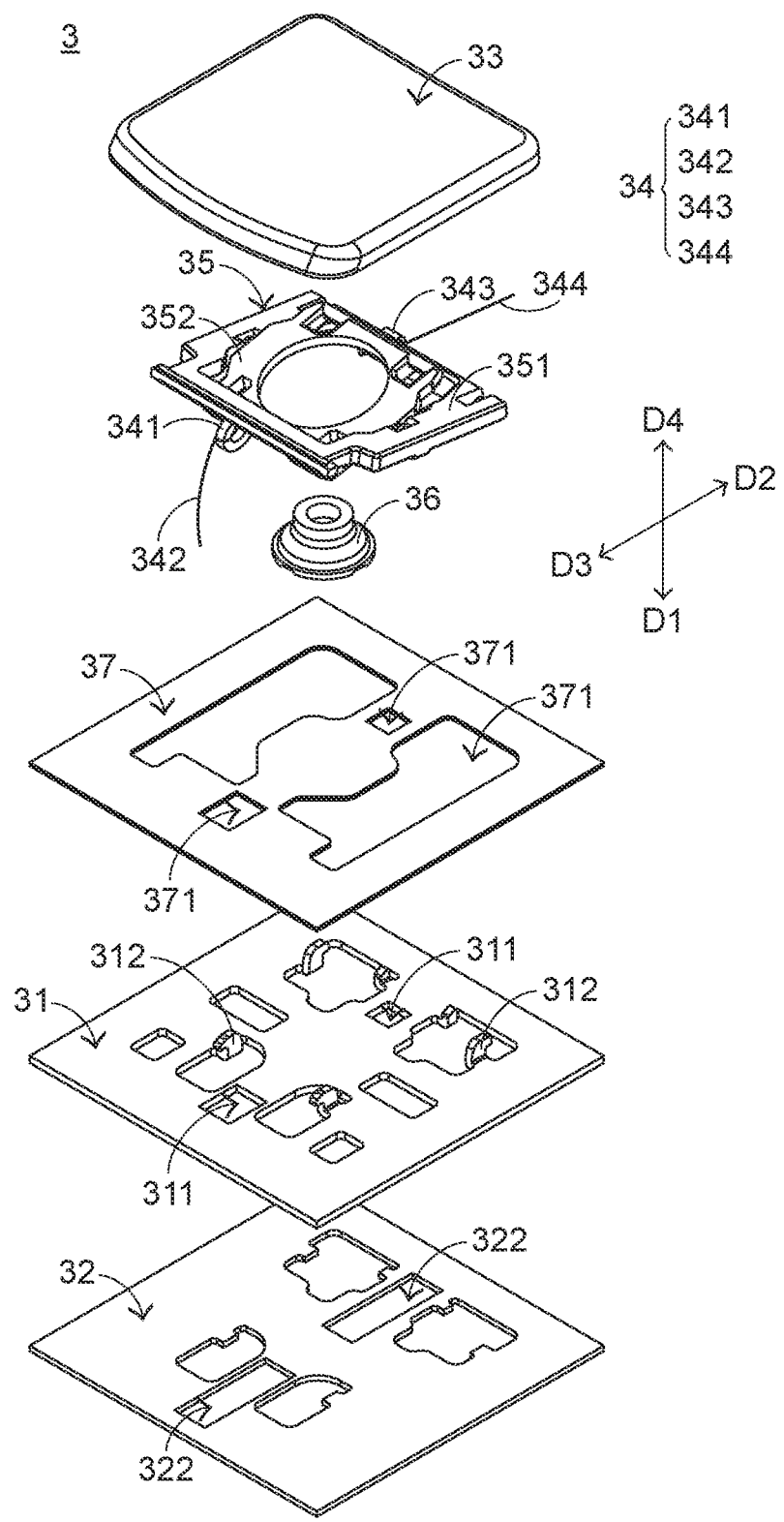
FIG. 8 is a schematic exploded view illustrating a key structure according to the second embodiment of the present invention.

The present invention further provides a second embodiment, which is distinguished from the first embodiment. FIG. 7 is a schematic side cross-sectional view illustrating a notebook computer with key structures according to a second embodiment of the present invention. FIG. 8 is a schematic exploded view illustrating a key structure according to the second embodiment of the present invention. As shown in FIGS. 7 and 8, the key structure 3 comprises a supporting plate 31, a movable element 32, a keycap 33, a coupling structure 34, a scissors-type connecting element 35, an elastic element 36 and a membrane switch circuit member 37. The scissors-type connecting element 35 comprises a first frame 351 and a second frame 352. The supporting plate 31 comprises plural supporting plate openings 311 and plural supporting plate hooks 312. The membrane switch circuit member 37 comprises plural membrane openings 371. The movable element 32 of the key structure 3 is installed in a keyboard base 301 of a notebook computer 300. The keyboard base 301 is connected with a top cover 302. A rotary shaft 303 is connected with the top cover 302 and a driving mechanism 304. The top cover 302 is rotatable relative to the keyboard base 301 through the rotary shaft 303. As the top cover 302 is rotated to different positions, the transmission mechanism 304 is enabled to allow the notebook computer 300 to be in different operation modes. For example, in case that the top cover 302 is closed to cover the keyboard base 301, the notebook computer 300 is in a hibernation mode or a power-off mode. Whereas, in case that the top cover 302 is uplifted to expose the key structures 3, the key structure 3 is in a laptop mode or in a usage state. When the top cover 302 is inversely folded to be contacted with a rear surface of the keyboard base 301, the key structure 3 is in a tablet mode or in a non-usage state (see FIG. 9). The structures and functions of the components of the key structure 3 which are identical to those of the first embodiment are not redundantly described herein. In comparison with the first embodiment, the key structure 3 of this embodiment has two distinguished aspects. Firstly, the structure of the movable element 32 and the way of driving the movable element 32 are distinguished. Secondly, the structure of the coupling structure 34 is distinguished.

Figure 10:
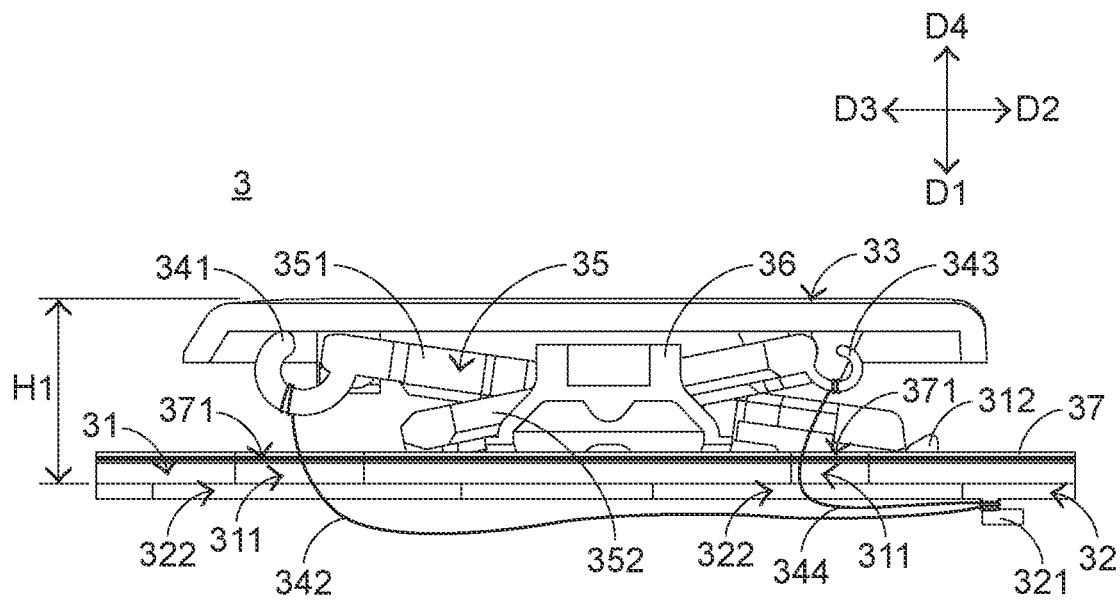
FIG. 10 is a schematic side cross-sectional view illustrating the key structure according to the second embodiment of the present invention.

The coupling structure 34 will be illustrated with reference to FIGS. 8 and 10. FIG. 10 is a schematic side cross-sectional view illustrating the key structure according to the second embodiment of the present invention. The coupling structure 34 comprises a first coupling hook 341, a first connecting part 342, a second coupling hook 343 and a second connecting part 344. The first coupling hook 341 is disposed on the first frame 351. The first connecting part 342 is connected with the first coupling hook 341 and a fixing hook 321 of the movable element 32. As the movable element 32 is moved, the scissors-type connecting element 35 and the keycap 33 are correspondingly moved through the first connecting part 342. The second coupling hook 343 is disposed on the second frame 352. The second connecting part 344 is connected with the second coupling hook 343 and the fixing hook 321 of the movable element 32. The function of the second connecting part 344 is similar to the function of the first connecting part 342. As the movable element 32 is moved, the scissors-type connecting element 35 and the keycap 33 are correspondingly moved through the second connecting part 344.

In this embodiment, the first coupling hook 341 is integrally formed with the first frame 351, the second coupling hook 343 is integrally formed with the second frame 352, and the first connecting part 342 and the second connecting part 344 are wires or retractable metal sheets. The above examples are presented herein for purpose of illustration and description only. In another embodiment, the first coupling hook is combined with or adhered to the first frame, and the second coupling hook is combined with or adhered to the second frame.

Figure 9:
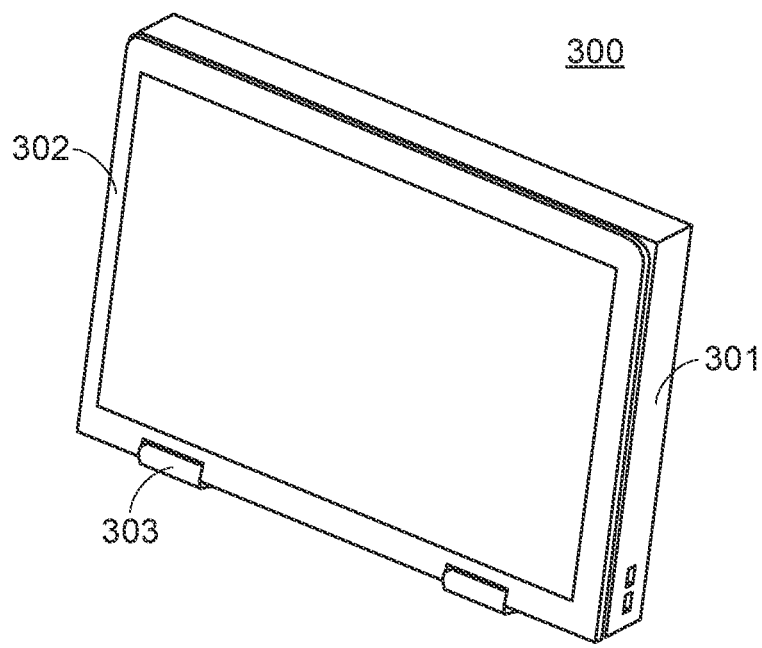
FIG. 9 is a schematic perspective view illustrating the notebook computer with the key structures according to the second embodiment of the present invention, in which the notebook computer is in a tablet mode.
Figure 11:
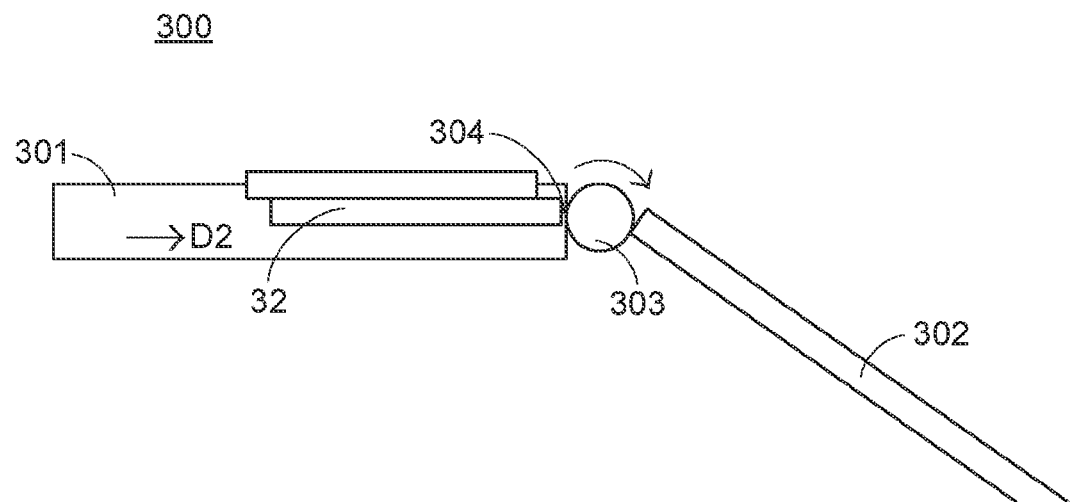
FIG. 11 is a schematic side cross-sectional view illustrating the notebook computer with key structures according to the second embodiment of the present invention, in which the movable element is pushed in the second direction.
Figure 12:
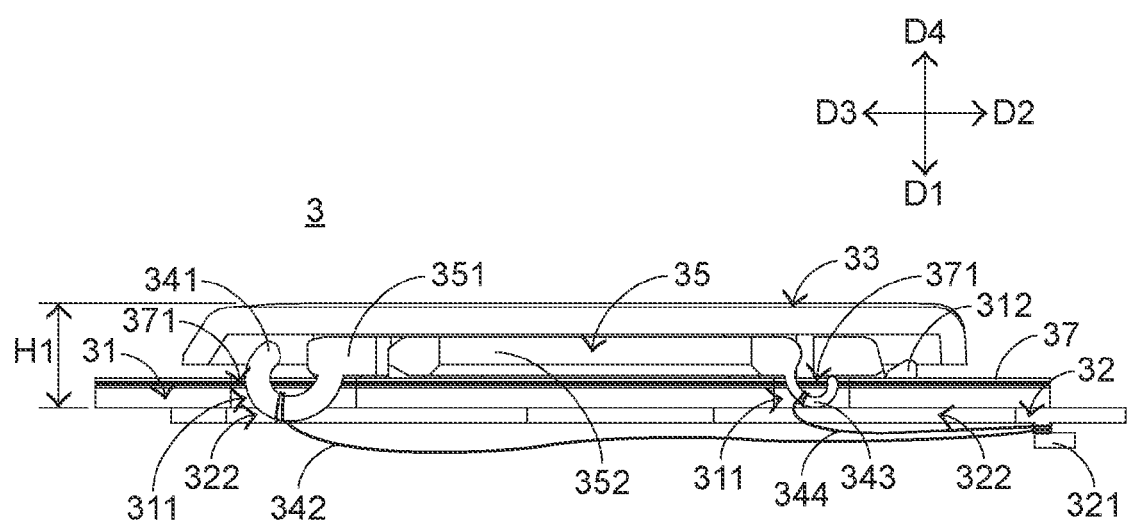
FIG. 12 is a schematic side cross-sectional view illustrating the key structure according to the second embodiment of the present invention, in which the movable element is pushed in the second direction.

A way of driving the movable element 32 will be described as follows. As shown in FIG. 7, the driving mechanism 304 is connected with the rotary shaft 303 and the movable element 32. When the top cover 302 is opened and uplifted, the rotary shaft 303 is rotated to drive the driving mechanism 304. Consequently, the movable element 32 is moved with the driving mechanism 304. Please refer to FIGS. 7-12. FIG. 11 is a schematic side cross-sectional view illustrating the notebook computer with key structures according to the second embodiment of the present invention, in which the movable element is pushed in the second direction. FIG. 12 is a schematic side cross-sectional view illustrating the key structure according to the second embodiment of the present invention, in which the movable element is pushed in the second direction. As shown in FIG. 7, the driving mechanism 304 is connected with the movable element 32 and linked with the movable element 32. For switching the operation mode of the notebook computer 300 to the tablet mode as shown in FIG. 9 (i.e., the slim-type mode of the key structure 3), the top cover 302 is folded in a clockwise direction to allow the top cover 302 to be contacted with the rear surface of the keyboard base 301. While the top cover 302 is folded in the clockwise direction, the rotary shaft 303 is rotated to push the driving mechanism 304 and thus the driving mechanism 304 is moved in the second direction D2 to push the movable element 32. Consequently, the movable element 32 is moved relative to the supporting plate 31 in the second direction D2. Moreover, as the movable element 32 is moved, the first coupling hook 341 and the second coupling hook 343 are respectively pulled by the first connecting part 342 and the second connecting part 344. Consequently, the scissors-type connecting element 35 is moved in the first direction D1, and the keycap 33 is correspondingly moved in the first direction D1. Under this circumstance, the height of keycap 33 is changed from the first height H1 to the second height H2. Moreover, the first coupling hook 341 is received in the corresponding membrane opening 371, the corresponding supporting plate hole 311 and a corresponding movable element hole 322, and the second coupling hook 343 is received in the corresponding membrane opening 371 and the corresponding supporting plate hole 311 (see FIG. 12).

For switching the operation mode of the notebook computer 300 from the tablet mode to the laptop mode (i.e., the usage state of the key structure), the driving mechanism 304 is moved in an opposite direction to push the movable element 32 in response to the rotation of the rotary shaft 303. Consequently, the movable element 32 is moved relative to the supporting plate 31 in the third direction D3. As the movable element 32 is moved, the first coupling hook 341 and the second coupling hook 343 are no longer pulled. Consequently, the scissors-type connecting element 35 is swung, and the keycap 33 is correspondingly moved in the fourth direction D4. Under this circumstance, the height of keycap 33 is returned from the second height H2 to the first height H1 (see FIG. 10).

In this embodiment, the first coupling hook and the second coupling hook of the key structure are disposed on the first frame and the second frame, respectively. In some other embodiments, only the first frame or the second frame is equipped with the coupling hook according to the practical requirements. When the connecting part is connected with the corresponding coupling hook and the fixing hook, the connection between the coupling structure and the movable element is established.

Figure 13:
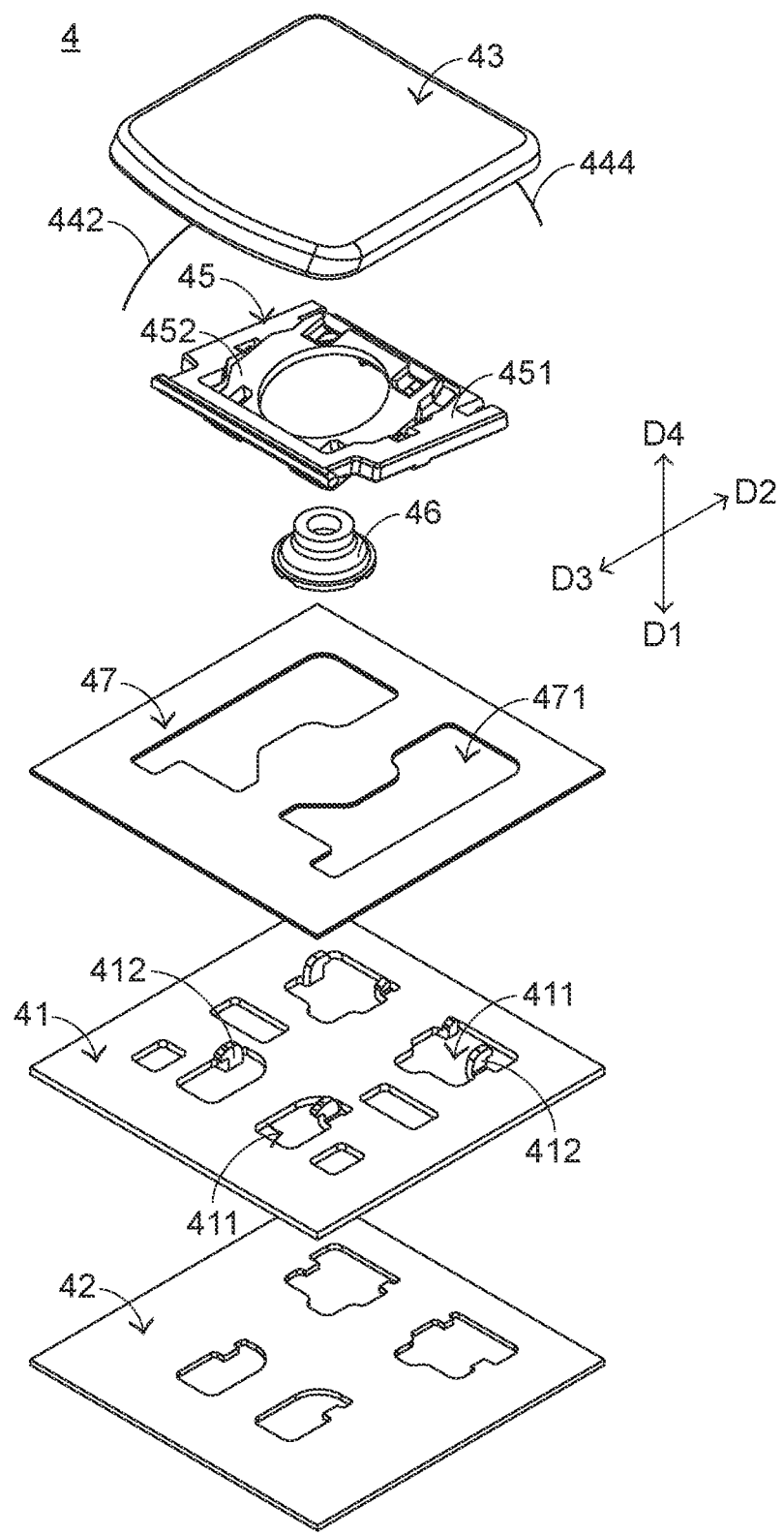
FIG. 13 is a schematic exploded view illustrating a key structure according to a third embodiment of the present invention.
Figure 14:
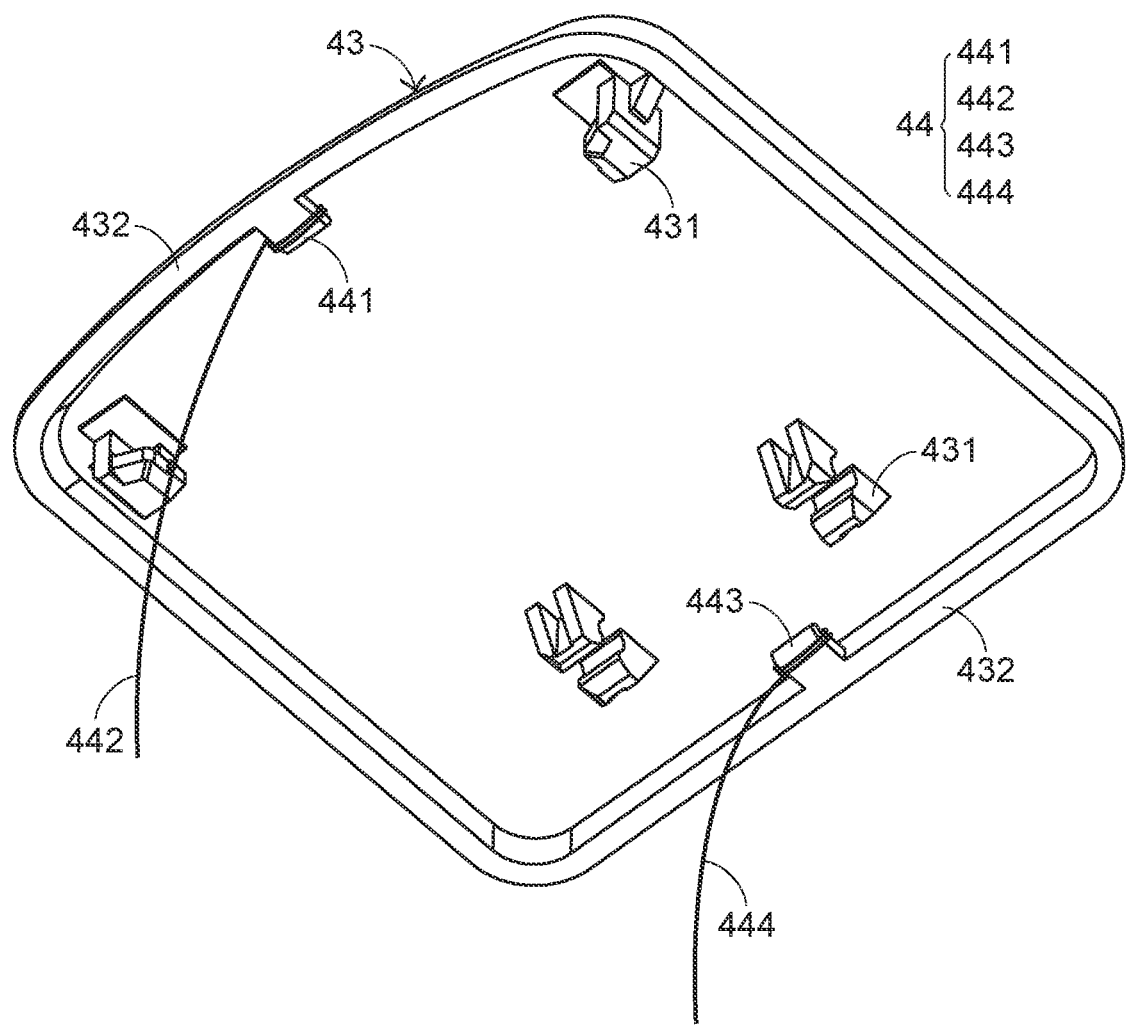
FIG. 14 is a schematic perspective view illustrating a keycap of the key structure of FIG. 13 and taken along another viewpoint.
Figure 15:
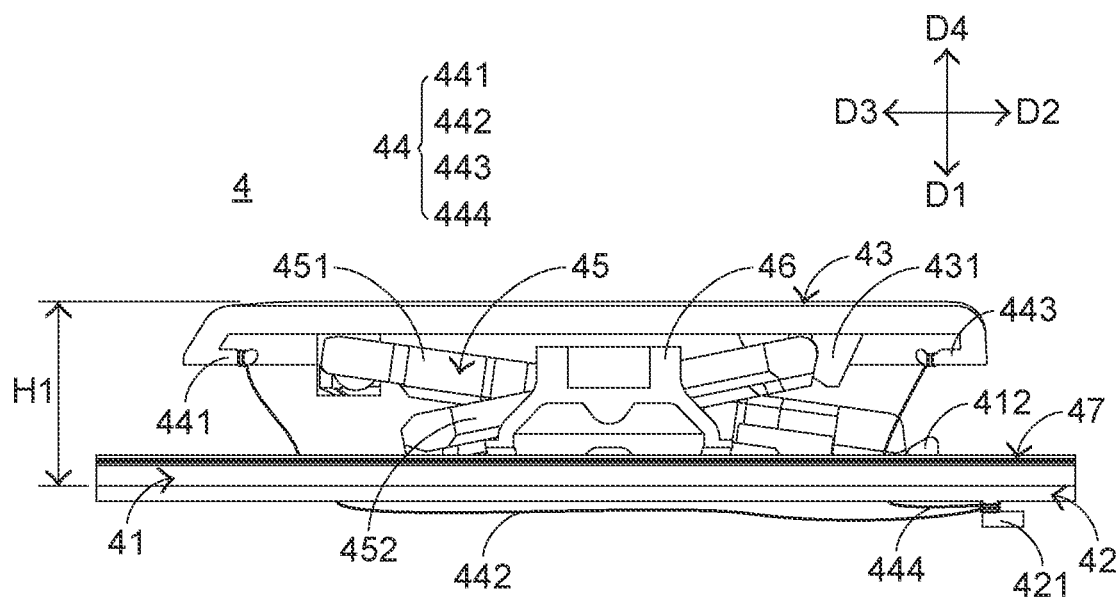
FIG. 15 is a schematic side cross-sectional view illustrating the key structure according to the third embodiment of the present invention.

The present invention further provides a third embodiment, which is distinguished from the above embodiments. FIG. 13 is a schematic exploded view illustrating a key structure according to a third embodiment of the present invention. FIG. 14 is a schematic perspective view illustrating a keycap of the key structure of FIG. 13 and taken along another viewpoint. FIG. 15 is a schematic side cross-sectional view illustrating the key structure according to the third embodiment of the present invention. As shown in FIGS. 13, 14 and 15, the key structure 4 comprises a supporting plate 41, a movable element 42, a keycap 43, a coupling structure 44, a scissors-type connecting element 45, an elastic element 46 and a membrane switch circuit member 47. The keycap 43 comprises plural keycap hooks 431. The scissors-type connecting element 45 comprises a first frame 451 and a second frame 452. The supporting plate 41 comprises plural supporting plate openings 411 and plural supporting plate hooks 412. The membrane switch circuit member 47 comprises plural membrane openings 471. The movable element 42 comprises a fixing hook 421. The movable element 42 of the key structure 4 is installed in a keyboard base 401 of a notebook computer (not shown). The structure of the notebook computer is similar to the structure of the notebook computer in the above embodiments, and is not redundantly described herein. The way of driving the movable element in the first embodiment or the second embodiment can be used to drive the movable element 42. In comparison with the above two embodiment, the coupling structure of this embodiment is distinguished.

Please refer to FIGS. 13, 14 and 15 again. The coupling structure 44 comprises a first coupling hook 441, a first connecting part 442, a second coupling hook 443 and a second connecting part 444. The first coupling hook 441 is disposed on a lateral edge 432 of the keycap 43. The first connecting part 442 is connected with the first coupling hook 441 and the fixing hook 421 of the movable element 42. As the movable element 42 is moved, the keycap 43 is correspondingly moved through the first connecting part 442. The second coupling hook 443 is disposed on another lateral edge 432 of the keycap 43. The second connecting part 444 is connected with the second coupling hook 443 and the fixing hook 421 of the movable element 42. The function of the second connecting part 444 is similar to the function of the first connecting part 442. As the movable element 42 is moved, the keycap 43 is correspondingly moved through the second connecting part 444. In this embodiment, the first coupling hook 441 and the second coupling hook 443 is integrally formed with the keycap 43, and the first connecting part 442 and the second connecting part 444 are wires or retractable metal sheets. The above examples are presented herein for purpose of illustration and description only.

Figure 16:
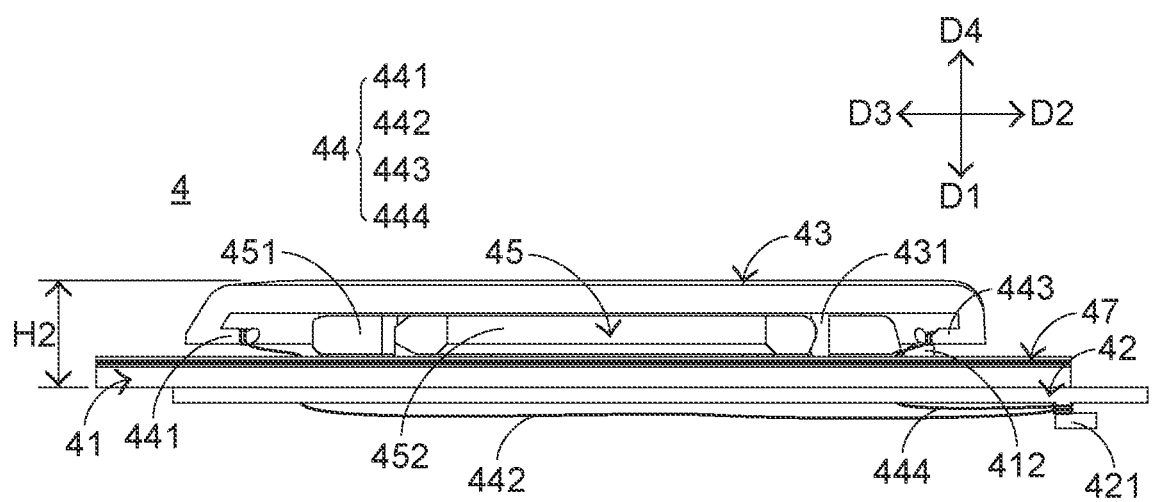
FIG. 16 is a schematic side cross-sectional view illustrating the key structure according to the third embodiment of the present invention, in which the movable element is pushed in the second direction.

Please refer to FIGS. 13-46. FIG. 16 is a schematic side cross-sectional view illustrating the key structure according to the third embodiment of the present invention, in which the movable element is pushed in the second direction. The operations of the key structure 4 of this embodiment will be described as follows. As the movable element 42 is moved relative to the second direction D2, the first coupling hook 441 and the second coupling hook 443 are respectively pulled by the first connecting part 442 and the second connecting part 444. Consequently, the keycap 43 is moved in the first direction D1. Under this circumstance, the height of keycap 43 is changed from the first height H1 to the second height H2 (see FIG. 16). As the movable element 42 is moved relative to the supporting plate 41 in the third direction D3, the first coupling hook 441 and the second coupling hook 443 are no longer pulled.

Consequently, the scissors-type connecting element 45 is swung, and the keycap 43 is correspondingly moved in the fourth direction D4. Under this circumstance, the height of keycap 43 is returned from the second height H2 to the first height H1 (see FIG. 15).

From the above descriptions, the present invention provides the key structure. The height of the key structure is changeable. For operating the key structure, the cooperation of the movable element and the coupling structure allows the keycap to be at a higher first height. For reducing the height of the key structure, the cooperation of the movable element and the coupling structure allows the keycap to be lowered. Consequently, the key structure has a slim appearance. In a laptop mode, the height of the key structure is not restricted. Since the movable distance of the keycap is increased, the tactile feel of depressing the key structure is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
   a supporting plate;
   a keycap disposed over the supporting plate, and movable relative to the supporting plate in a first direction;
   a scissors-type connecting element connected with the supporting plate and the keycap;
   a movable element disposed under the supporting plate, and movable relative to the supporting plate in a second direction; and
   a coupling structure connected with the movable element, and moved with the movable element, wherein while the movable element is moved in the second direction, the coupling structure is moved with the movable element and the keycap is correspondingly moved in the first direction, wherein the coupling structure is a coupling frame that is disposed on a bottom surface of the scissors-type connecting element, and the coupling frame has a first contact slant, wherein the movable element comprises a linking part that is deposed on a bottom surface of the movable element, and a second contact slant is formed between the linking part and the bottom surface of the movable element, wherein the linking part is inserted into the coupling frame, and the first contact slant and the second contact slant are contacted with each other,
   wherein while the movable element is moved in the second direction, the first contact slant of the coupling structure is pushed by the second contact slant, and the keycap is correspondingly moved in the first direction, so that the key structure is switched from a laptop mode to a slim-type mode, wherein while the movable element is moved in a third direction opposite to the second direction, the first contact slant is not pushed by the second contact slant, the coupling structure is moved along the second contact slant to the bottom surface of the movable element, and the keycap is correspondingly moved in a fourth direction opposite to the first direction, so that the key structure is switched from the slim-type mode to the laptop mode.

2. The key structure according to claim 1, wherein the supporting plate comprises a supporting plate opening corresponding to the coupling frame, and the coupling frame is penetrated through the supporting plate opening and contacted with the linking part.

3. The key structure according to claim 1, further comprising:
   a membrane switch circuit member disposed over the supporting plate, wherein as the keycap is moved, a key signal corresponding to the keycap is generated by the membrane switch circuit member; and
   an elastic element arranged between the keycap and the membrane switch circuit member, wherein when the elastic element is pushed by the keycap, the membrane switch circuit member is triggered by the elastic element, wherein when the keycap is no longer depressed, the elastic element provides an elastic force to the keycap, the keycap is moved in response to the elastic force, and the scissors-type connecting element is correspondingly swung.

4. A key structure, comprising:
a supporting plate;
a keycap disposed over the supporting plate, and movable relative to the supporting plate in a first direction;
a scissors-type connecting element connected with the supporting plate and the keycap, wherein the scissors-type connecting element comprises a first frame and a second frame, wherein the second frame is combined with the first frame, and swung relative to the first frame;
a movable element disposed under the supporting plate, and movable relative to the supporting plate in a second direction; and
a coupling structure connected with the movable element, and moved with the movable element, wherein while the movable element is moved in the second direction, the coupling structure is moved with the movable element and the keycap is correspondingly moved in the first direction, wherein the coupling structure is disposed on the first frame and comprises:
a coupling hook disposed on the first frame; and
a connecting part connected with the coupling hook and the movable element, wherein as the movable element is moved, the keycap is correspondingly moved through the connecting part,
wherein while the movable element is moved in the second direction to pull the connecting part, the coupling hook is pulled by the connecting part, and the keycap is correspondingly moved in the first direction, so that the key structure is switched from a laptop mode to a slim-type mode, wherein while the movable element is moved in a third direction opposite to the second direction, the connecting part is not pulled, the scissors-type connecting element is swung and the keycap is correspondingly moved in a fourth direction opposite to the first direction, so that the key structure is switched from the slim-type mode to the laptop mode.

5. The key structure according to claim 4, further comprising:
a membrane switch circuit member disposed over the supporting plate, wherein as the keycap is moved, a key signal corresponding to the keycap is generated by the membrane switch circuit member; and
an elastic element arranged between the keycap and the membrane switch circuit member, wherein when the elastic element is pushed by the keycap, the membrane switch circuit member is triggered by the elastic element, wherein when the keycap is no longer depressed, the elastic element provides an elastic force to the keycap, the keycap is moved in response to the elastic force, and the scissors-type connecting element is correspondingly swung.

6. A key structure, comprising:
a supporting plate;
a keycap disposed over the supporting plate, and movable relative to the supporting plate in a first direction;
a scissors-type connecting element connected with the supporting plate and the keycap, wherein the scissors-type connecting element comprises a first frame and a second frame, wherein the second frame is combined with the first frame, and swung relative to the first frame;
a movable element disposed under the supporting plate, and movable relative to the supporting plate in a second direction; and
a coupling structure connected with the movable element, and moved with the movable element, wherein while the movable element is moved in the second direction, the coupling structure is moved with the movable element and the keycap is correspondingly moved in the first direction, wherein the coupling structure is disposed on the second frame and comprises:
a coupling hook disposed on the second frame; and
a connecting part connected with the coupling hook and the movable element, wherein as the movable element is moved, the keycap is correspondingly moved through the connecting part,
wherein while the movable element is moved in the second direction to pull the connecting part, the coupling hook is pulled by the connecting part, and the keycap is correspondingly moved in the first direction, so that the key structure is switched from a laptop mode to a slim-type mode, wherein while the movable element is moved in a third direction opposite to the second direction, the connecting part is not pulled, the scissors-type connecting element is swung and the keycap is correspondingly moved in a fourth direction opposite to the first direction, so that the key structure is switched from the slim-type mode to the laptop mode.

7. The key structure according to claim 6, further comprising:
a membrane switch circuit member disposed over the supporting plate, wherein as the keycap is moved, a key signal corresponding to the keycap is generated by the membrane switch circuit member; and
an elastic element arranged between the keycap and the membrane switch circuit member, wherein when the elastic element is pushed by the keycap, the membrane switch circuit member is triggered by the elastic element, wherein when the keycap is no longer depressed, the elastic element provides an elastic force to the keycap, the keycap is moved in response to the elastic force, and the scissors-type connecting element is correspondingly swung.

8. A key structure, comprising:
a supporting plate;
a keycap disposed over the supporting plate, and movable relative to the supporting plate in a first direction;
a scissors-type connecting element connected with the supporting plate and the keycap;
a movable element disposed under the supporting plate, and movable relative to the supporting plate in a second direction; and
a coupling structure connected with the movable element, and moved with the movable element, wherein while the movable element is moved in the second direction, the coupling structure is moved with the movable element and the keycap is correspondingly moved in the first direction, wherein the coupling structure comprises:
a coupling hook disposed on a lateral edge of the keycap; and
a connecting part connected with the coupling hook and the movable element, wherein as the movable element is moved, the keycap is correspondingly moved through the connecting part, wherein while the movable element is moved in the second direction to pull the connecting part, the coupling hook is pulled by the connecting part, and the keycap is correspondingly moved in the first direction, so that the key structure is switched from a laptop mode to a slim-type mode, wherein while the movable element is moved in a third direction opposite to the second direction, the connecting part is not pulled, the scissors-type connecting element is swung and the keycap is correspondingly moved in a fourth direction opposite to the first direction, so that the key structure is switched from the slim-type mode to the laptop mode.

9. The key structure according to claim 8, further comprising:

a membrane switch circuit member disposed over the supporting plate, wherein as the keycap is moved, a key signal corresponding to the keycap is generated by the membrane switch circuit member; and an elastic element arranged between the keycap and the membrane switch circuit member, wherein when the elastic element is pushed by the keycap, the membrane switch circuit member is triggered by the elastic element, wherein when the keycap is no longer depressed, the elastic element provides an elastic force to the keycap, the keycap is moved in response to the elastic force, and the scissors-type connecting element is correspondingly swung.

* * * * *